United States Patent [19]

Takami

[11] 4,236,801

[45] Dec. 2, 1980

[54] EXPOSURE FACTOR SWITCHING CIRCUIT

[75] Inventor: Satoshi Takami, Eiza, Japan

[73] Assignee: Asahi Kogaku Kogyo Kabushiki Kaisha, Tokyo, Japan

[21] Appl. No.: 12,422

[22] Filed: Feb. 15, 1979

[30] Foreign Application Priority Data

Feb. 17, 1978 [JP] Japan ............................. 53-19390[U]

[51] Int. Cl.$^3$ .......................... G03B 9/08; H03K 5/13; H01H 47/32

[52] U.S. Cl. ................................... 354/234; 361/196; 307/293; 323/4

[58] Field of Search ..................... 354/234, 235, 60 R; 307/293, 294; 361/196; 328/129; 323/1, 4; 363/13; 330/288; 340/309.1

[56] References Cited

U.S. PATENT DOCUMENTS

| | | | |
|---|---|---|---|
| 3,761,741 | 9/1973 | Hoeft | 323/1 |
| 3,970,874 | 10/1976 | Kawasaki | 354/235 X |
| 4,061,959 | 12/1977 | Ahmed | 323/1 |

FOREIGN PATENT DOCUMENTS 585489 12/1977 U.S.S.R. ...................................... 323/1

*Primary Examiner*—Michael L. Gellner
*Assistant Examiner*—William B. Perkey
*Attorney, Agent, or Firm*—Sughrue, Rothwell, Mion, Zinn and Macpeck

[57] ABSTRACT

An exposure factor switching circuit in a camera with an exposure control circuit having an emitter follower transistor adapted to apply a voltage through at least one transistor driven by a current flowing in the emitter thereof. A time constant circuit is adapted to control a shutter control magnet with an integration voltage due to a collector current of another transistor to the base of which the output of the emitter follower transistor is applied. A bias current supply circuit is employed having a plurality of transistors one of which is provided with a switch connected to the emitter thereof. The switch is operated to selectively activate the plurality of transistors to vary the emitter current of the emitter follower transistor.

9 Claims, 3 Drawing Figures

EXPOSURE FACTOR SWITCHING CIRCUIT

BACKGROUND OF THE INVENTION

This invention relates to a circuit for switching the exposure factor of a camera.

Heretofore, the technique of switching the factor of exposure time (hereinafter referred to as "the exposure factor" when applicable) of an exposure time control circuit utilized a time constant circuit adapted to control the shutter control magnet by means of an integration voltage due to the collector current of a transistor. This was used together with a circuit adapted to apply a voltage across the base and emitter of the transistor. It is an arrangement in which in the circuit adapted to apply a voltage across the base and emitter of the transistor, a current flows in a variable resistor and the resistance of the variable resistor is changed, so that the voltage across the variable resistor is changed.

However, in using a variable resistor, the movable contact slides on the fixed resistance track, and therefore the contact resistance caused a problem. Furthermore, the resistance value may vary with time and temperature, and depending on its material.

In general, the exposure factors used with a camera are of the integer numbers (such as two (2) times, a half (½) time, etc.); that is, the values between such integer numbers are rarely used. Accordingly, in view of the construction of the variable resistor, the space for providing the intermediate resistances other than the set resistances is generally useless.

SUMMARY OF THE INVENTION

Accordingly, an object of this invention is to provide an exposure factor switching circuit in which a variable resistor is not employed.

It is another object of this invention to provide an exposure factor switching circuit using a switching mechanism adapted merely to open and close.

It is another object of this invention to provide an exposure factor switching circuit which is simple in operation, high in reliability and low in manufacturing cost.

These and other objects of this invention are accomplished by means of an exposure factor switching circuit having an emitter follower transistor adapted to apply a voltage through at least one transistor driven by emitter current and a time constant circuit adapted to control a shutter control magnet with an integration voltage due to collector current of a second transistor having the output of the emitter follower transistor applied to the base thereof.

A bias current supplying circuit comprises a plurality of transistors one of which being provided with a switch connected to the emitter thereof. The switch is operative to selectively activate the plurality of transistors to vary the emitter current of the emitter follower transistor.

The invention will be described with reference to the accompanying drawings and the description of the preferred embodiment that follows.

DESCRIPTION OF THE PREFERRED EMBODIMENT

Figure 1:
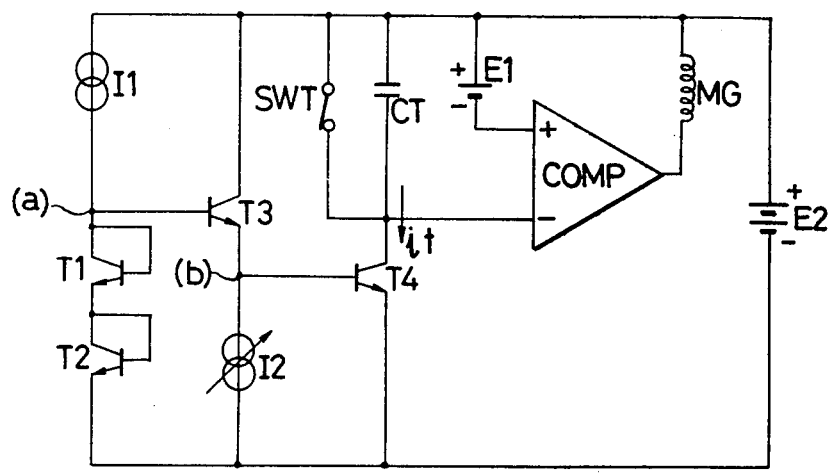
FIG. 1 shows an exposure control circuit for a description of the operating principle of this invention.

FIG. 1 shows an exposure control circuit for a description of the operating principle of the present invention. A constant current source I1 is connected in series to a diode-connected transistor T1 which is also connected in series to a diode-connected transistor T2. The collector (or base) of the transistor T1 is connected to the base of a transistor T3 the emitter of which is in turn connected to a current source I2 and to the base of a transistor T4. The collector of the transistor T4 is connected through a parallel circuit of a capacitor CT and a switch SWT to an electric source E2. It is also connected to the inversion terminal (−) of a voltage comparator COMP. The non-inversion terminal (+) of the voltage comparator COMP is connected through another electric source E1 to the electric source E2. The output terminal of the voltage comparator COMP is connected through a magnet MG to the electric source E2. The transistors T1 through T4 are NPN type transistors.

A collector current $i_t$ flows in the transistor T4 with the aid of a voltage at the point (b) in FIG. 1. Since the switch SWT is normally closed and the potential at the inversion terminal of the voltage comparator COMP is higher than that at the non-inversion terminal thereof, the voltage at the output terminal thereof is low. Accordingly, the magnet MG is energized to maintain the shutter closed. When the switch SWT is opened in synchronization with the start of opening the shutter, the capacitor CT is charged by the collector current of the transistor T4. When the capacitor CT is charged to a value higher than the voltage of the electric source E1, the voltage at the inversion terminal of the voltage comparator COMP becomes lower than that at the non-inversion terminal thereof, and the voltage of the output terminal thereof is increased. Accordingly, the magnet MG is deenergized, and the shutter is therefore closed.

In general, the following equation (1) is established between the base-emitter voltage of a transistor and the collector current:

$$V_{BE}=(KT/q) \ln (i_c/i_o)+V_{BEO} \quad (1)$$

where: q is the electron charge, K is the Boltzmann's constant, T is the absolute temperature, $i_c$ is the collector current, $i_o$ is a collector current, $V_{BEO}$ is the base-emitter voltage obtained when the collector current $i_o$ flows, and $V_{BE}$ is the base-emitter voltage obtained when the collector current $i_c$ flows.

If this relation is applied to the transistors T1 through T4, then the following equations (2) through (5) can be obtained for them, respectively:

$$V_{BE1}=(KT/q) \ln (i_1/i_o)+V_{BEO} \quad (2)$$

$$V_{BE2}=(KT/q) \ln (i_1/i_o)+V_{BEO} \quad (3)$$

$$V_{BE3}=(KT/q) \ln (i_2/i_o)+V_{BEO} \quad (4)$$

$$V_{BE4}=(KT/q) \ln (i_t/i_o)+V_{BEO} \quad (5)$$

where: $V_{BE1}$ through $V_{BE4}$ are the base-emitter voltages of the transistors T1 through T4, respectively, $i_1$ is the current of the constant current source I1, $i_2$ is the current of the current source I2, $i_t$ is the collector current of the transistor T4.

In the circuit shown in FIG. 1, the relation of these voltages is as follows:

$$V_{BE1} + V_{BE2} = V_{BE3} + V_{BE4} \tag{6}$$

If the equations (2) through (5) are substituted into the equation (6) and the equation (6) is rearranged, then $$\ln (i_1^2/i_o^2) = \ln (i_2 \cdot i_t/i_o^2) \tag{7}$$

Therefore, $$i_1^2/i_o^2 = i_2 \cdot i_t/i_o^2 \tag{8}$$

The equation (8) can be rewritten as follows:

$$i_t = i_1^2/i_2 \tag{9}$$

Charging the capacitor CT with the collector current $i_t$ of the transistor T4 can be expressed as follows:

$$C_t \cdot V = i_t \cdot T \tag{10}$$

where: $C_t$ is the capacitance of the capacitor CT, V is the charging voltage, and T is the time.

The equation (10) can be rewritten as follows:

$$i_t = C_t V/T \tag{11}$$

From the equation (9)

$$i_t = i_1^2/i_2 = C_t V/T \tag{12}$$

Since $i_t$ is a constant current, if it is assumed that V is a constant voltage, then the following expression can be provided:

$$i_2 \propto T \tag{13}$$

The value $i_2$ corresponds to the exposure time. Therefore, it can be understood that the exposure time can be changed by changing the current value $i_2$ of the current source I2.

Figure 2:
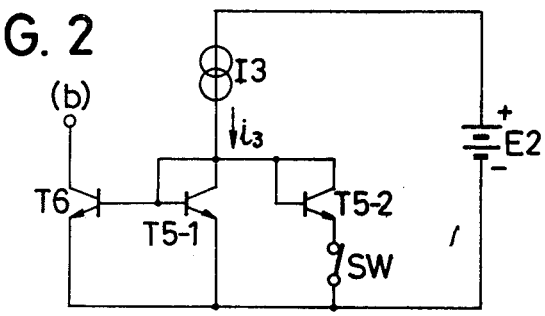
FIG. 2 shows a bias current supplying circuit.

FIG. 2 illustrates a bias current supplying circuit I2. The current of a constant current source I3 connected to the positive terminal of an electric source E2 flows to the collector of a diode-connected transistor T5-1. The collector of the transistor T5-1 is connected to the collector of a diode-connected transistor T5-2 and to the base of a transistor T6. The emitters of the transistors T6 and T5-1 are connected to the negative terminal of the electric source E2. The emitter of the transistor T5-2 is connected through a switch SW to the negative terminal of the electric source E2. The transistors T6, T5-1 and T5-2 are NPN type transistors. Furthermore transistors T6, T5-1 and T5-2 are equal in characterstic, showing the same base-emitter voltage vs collector current value.

When the switch SW is opened, the transistor T5-2 is rendered non-conductive, and therefore the current $i_3$ of the current source I3 flows only to the collector of the transistor T5-1. Since these transistors have the same characteristics as described above, the same current as that of the current source I3 flows to the collector of the transistor T6.

When the switch SW is closed, the current of the current source I3 is divided into two component currents which flow in the transistors T5-1 and T5-2, respectively. Since the transistors T5-1 and T5-2 are equal in characteristic, the collector current of each of the transistors T5-1 and T5-2 is $i_3/2$. Also, since the base-emitter voltage of the transistor T5-1 or T5-2 is equal to that of the transistor T6, the collector current of the transistor T6 is also $i_3/2$.

As is apparent from the above description, the current value of the transistor T6 can be changed by changing the number of transistors operating actively in the bias current supplying circuit. If the current source I2 in FIG. 1 is formed as shown in FIG. 2, the current value of the current source I2 obtained when the switch SW in FIG. 2 is closed is reduced to a half ($\frac{1}{2}$) of the current value of the current source I2 obtained when the switch SW is opened. Accordingly, as is apparent from equation (12), the exposure control time is also reduced to a half. Thus, the exposure time can be controlled by controlling the current value of the current source.

Figure 3:
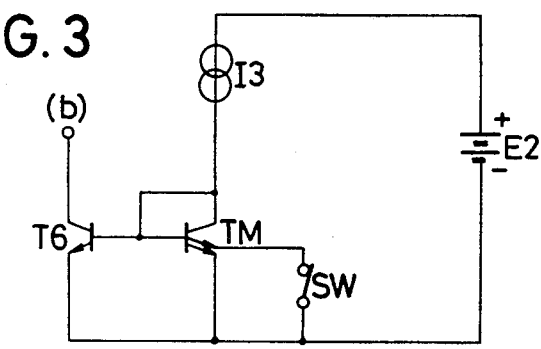
FIG. 3 shows a bias current supplying circuit having a multi-emitter transistor.

If the transistors T5-1, T5-2 and T6 are manufactured so that they are the same IC chip, it is possible to give sufficiently equal characteristics to them. Furthermore, if, in the case where the transistors T5-1 and T5-2 are manufactured in the form of an integrated circuit, they can be formed as a multi-emitter transistor and the same characteristics can be provided. This is shown in FIG. 3 where the multi-emitter transistor Tn is equivalent to transistors T5-1 and T5-2 of FIG. 2.

As is apparent from the above description, according to the invention, the exposure time can be changed merely by opening and closing the switch, and therefore the troublesome control with the variable resistor used in the prior art can be eliminated. Furthermore, the use of transistors equal in characteristic can correctly change the exposure factor. The exposure factor switching means of the exposure control circuit is only the switch. Therefore, where it is built in a camera, the construction is relatively simple. Thus, this invention provides the exposure factor switching circuit which is simple in operation, high in reliability, and low in cost when compared with the conventional one using the variable resistor.

I claim:

1. For an exposure factor switching circuit for a camera with an exposure control circuit having an emitter follower transistor applying a voltage through at least one transistor which is driven by a current flowing in the emitter thereof, a time constant circuit controlling a shutter control magnet with an integration voltage due to a collector current of a second transistor, the output of said emitter follower transistor being applied to the base of said second transistor, the improvement comprising; a bias current supplying circuit comprising a plurality of transistors, one transistor of said plurality of transistors being emitter coupled to an exposure factor switch, said bias current supply coupled to the emitter of said emitter follow transistor, and wherein said switch is operated to selectively activate said plurality of transistors to vary the emitter current of said emitter follower transistor.

2. The circuit of claim 1 wherein said bias current supply circuit further comprises a constant current source coupled to said plurality of transistors, and an output transistor having its collector coupled to the emitter of said emitter follower transistor.

3. The circuit of claim 2 wherein the plurality of transistors of said bias current supplying circuit comprises a plurality of diode connected transistors, said diode connected transistors having their collectors coupled to the base of said output transistor.

4. The circuit of claim 3 wherein said output transistor and said diode connected transistors have substantially equal base-emitter voltage vs collector current value characteristics.

5. For an exposure factor switching circuit for a camera with an exposure control circuit having an emitter follower transistor applying a voltage through at least one transistor which is driven by a current flowing in the emitter thereof, a time constant circuit controlling a shutter control magnet with an integration voltage due to a collector current of a second transistor, the output of said emitter follower transistor being applied to the base of said second transistor, the improvement comprising; a bias current supplying circuit comprising a multi-emitter transistor, one emitter of which is coupled to an exposure factor switch, said bias current supply coupled to the emitter of said emitter follow transistor, and wherein said switch is operated to selectively activate said multi-emitter transistor to vary the emitter current of said emitter follower transistor.

6. The circuit of claim 5 wherein said multi-emitter transistor and said output transistor have substantially equal base-emitter voltage vs collector current value characteristics.

7. The circuit of claims 1, 3 or 5 wherein said time circuit comprises a capacitor in a parallel circuit with a synchronization switch, the collector of said second transistor being coupled to said parallel circuit and a comparator, said collector of said second transistor being coupled to one input of said comparator, and a voltage source coupled to the other input of said comparator.

8. The circuit of claim 7 wherein said synchronization switch is opened with the initiation of opening of a shutter in said camera.

9. The circuit of claims 1, 3 or 5 wherein said exposure factor switch reduces the current output of said bias current supplying circuit to one half the normal output when said exposure factor switch is closed.

* * * * *